No. 663,674.                                    Patented Dec. 11, 1900.
P. DIEHL & M. HEMLEB.
THREAD CASE FOR SEWING MACHINES.
(Application filed Aug. 7, 1900.)
(No Model.)
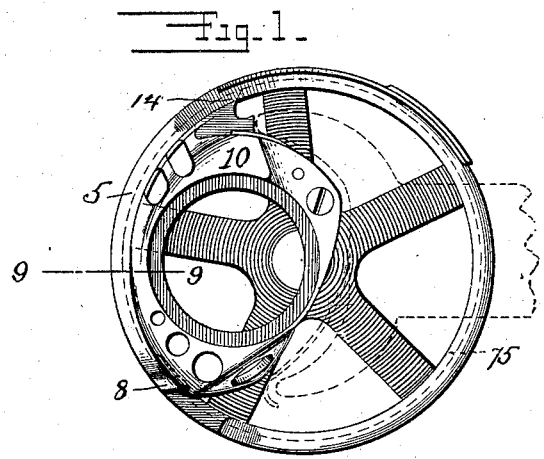
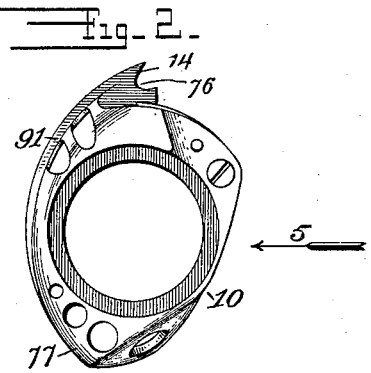
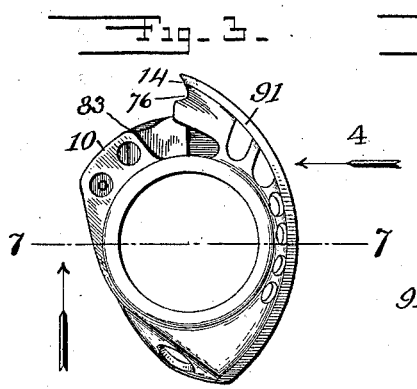
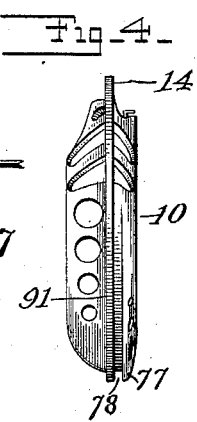
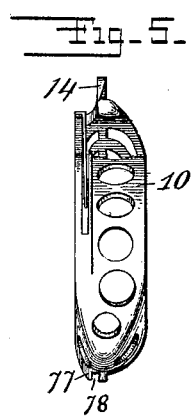
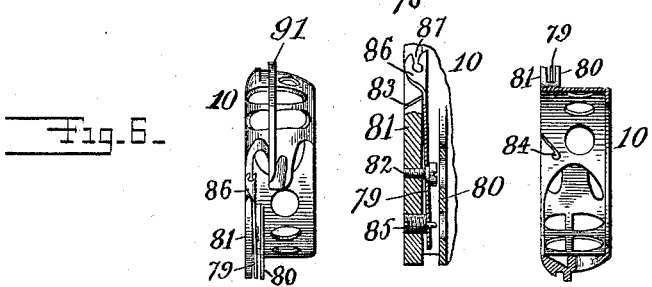
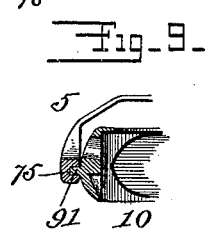
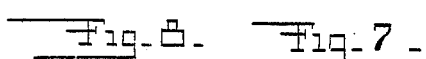
WITNESSES:                                      INVENTORS:
F. N. Roehrich                                  Philip Diehl
C. M. Sweeney                                   Martin Hemleb,
                                                BY
                                                ATTORNEY.

UNITED STATES PATENT OFFICE.

PHILIP DIEHL AND MARTIN HEMLEB, OF ELIZABETH, NEW JERSEY, ASSIGNORS TO THE SINGER MANUFACTURING COMPANY, OF NEW JERSEY.

THREAD-CASE FOR SEWING-MACHINES.

SPECIFICATION forming part of Letters Patent No. 663,674, dated December 11, 1900.

Application filed August 7, 1900. Serial No. 26,139. (No model.)

*To all whom it may concern:*

Be it known that we, PHILIP DIEHL and MARTIN HEMLEB, citizens of the United States, residing at Elizabeth, in the county of Union and State of New Jersey, have invented certain new and useful Improvements in Sewing-Machine Thread-Cases, of which the following is a specification, reference being had therein to the accompanying drawings.

This invention relates to a stationary bobbin-case or thread-case adapted for use in connection with a circularly-moving rotating or oscillating hook and peripherally supported by the hook or hook-ring eccentric to the axis thereof, as described in United States application, Serial No. 736,263, filed November 8, 1899; and the invention has for its object to provide a thread-case having a rib-and-groove connection with the hook and about which the needle-loops will be carried by the hook without danger of wedging or catching the needle-thread between the moving and stationary surfaces, as also to provide a convenient and efficient tension device for the bobbin-thread.

In the accompanying drawings, Figure 1 is a face view of the circularly-moving hook and the stationary thread-case with the bobbin therein, the beak of the hook being in cast-off position relative to the thread-case. Figs. 2 and 3 are opposite side views of the thread-case; Figs. 4 and 5, opposite edge views thereof, and Fig. 6 is a top plan view thereof. Fig. 7 is a section on line 7 7, Fig. 3. Fig. 8 is a detail section, on an enlarged scale, to show the tension device; and Fig. 9 is a detail section on line 9 9, Fig. 1, of parts of the hook and thread-case.

Referring to the drawings, 5 denotes a hook-ring or hook to which, in the use of the invention, oscillating or rotating movements will be imparted, said hook-ring having a loop-seizing beak or hook proper, 8, which inclines inwardly from the periphery of the hook-ring and is somewhat flattened transversely on its under side. The segmental thread-case or bobbin-case 10, supported by the hook-ring or hook, is provided on one side with a segmental peripheral flange 91, received in an interior annular groove 75 in the hook-ring 5, said flange terminating at one end in a loop-dividing hook 14, the extreme point of which is housed in said groove, the notch 76 of said hook receiving the bights of the loops of needle-thread carried into said notch by the beak 8 of the hook-ring 5, so that each needle-loop will be divided by said hook 14, and thus one limb of the loop will pass behind the thread-case and the other limb will pass over the front thereof as the loop is carried around the said thread-case by the beak of the said hook-ring. The thread-case is held stationary or restrained from moving with the circularly-moving hook 5, and the flange 91 of the thread-case is retained in the groove 75 of the hook by a stationary holder extending within the field of the hook-ring or hook, said holder being denoted by dotted lines in Fig. 1. The thread-case or bobbin-case 10 is provided near its heel portion with a second rib or flange 77, rising gradually from the body of the said thread-case toward the heel of the latter, where it reaches the height of the segmental rib or flange 91, forming between said ribs or flanges the groove 78, in which the flattened inner part of the beak 8 extends, so that the point of said beak is housed in said groove 78, as denoted in dotted lines in Fig. 1, as the said beak carries the needle-thread over the heel of the thread-case. The flange 77, coöperating with the flange 91 and beak 8, thus serves as a thread-guard to prevent the needle-thread from getting into the interior groove 75 of the hook-ring, where it might become wedged between the thread-case and hook-ring, and thus obstruct and clog the proper operation of the machine. When the thread-case is provided with the guard-flange 77, the needle-thread loop will be pushed along over the heel of the thread-case by the advancing front of the beak 8, and as the point of said beak is at this time housed in the groove 78 the said guard-flange 77 effectually prevents the thread from getting under the said point of said beak or between the hook and the thread-case. The guard-flange 77 is thus an important feature of the improved thread-case.

When the improved thread-case is used in connection with a vertically-placed hook-ring or hook oscillating or rotating in a vertical plane, it is held in an upright position, as shown in the drawings, and for use in such position it is preferably furnished at its upper portion with a tension lever-spring 79, a portion of which is received in a groove formed between two walls or flanges 80 and 81, said spring being loosely pivoted laterally between a shoulder on a holding-screw 82 and the wall 81 and the said wall being provided with an inclined threading-slot 83, leading from its outer to its inner face and to a hole or thread-eye 84, formed in the wall of the bobbin-chamber. The tension lever-spring 79 bears at its free or forward end against the inner face of the wall 81, and tapped in said wall is an adjusting-screw 85, which bears against the side of said spring at its other or rear end portion, so that by turning said screw from the outer side of the thread-case the tension-pressure of said spring against the inner face of the wall 81 may be regulated as desired. The said tension-spring is provided with a small lip 86, overlying the top of the wall 81 and having a notch 87, which receives and guides the outwardly-running bobbin-thread and prevents it from becoming displaced.

In threading the bobbin-case the thread is drawn into the slot 83 and hole 84, so as to be between the tension-spring 79 and the inner face of the wall 81, and said thread is also drawn beneath the lip 86 and into the notch 87 of the tension-spring. The tension may be conveniently regulated without removing the thread-case from the machine by turning the adjusting-screw 85, which is accessible from the front of the hook-ring and thread-case.

Having thus described our invention, we claim and desire to secure by Letters Patent—

1. A sewing-machine thread-case or bobbin-case provided with a segmental peripheral rib or flange having a loop-dividing hook at one end, said peripheral rib or flange extending from said loop-dividing hook to the heel of said thread-case and said thread-case having adjacent to the other end of said rib or flange and near the heel of said thread-case a second or guard rib or flange starting from the surface of said thread-case near the middle of the said peripheral rib or flange and rising gradually, toward the heel of the said thread-case, to the height of the said peripheral rib or flange, to form, between said ribs or flanges, a groove to receive and house the point of the beak of a circularly-moving hook.

2. The combination with a hook-ring provided with a loop-taking beak and with an interior groove, of a thread-case having at one edge, only, a peripheral segmental rib or flange fitting in said groove and provided at one end with a loop-dividing hook the point of which is housed in said groove, said thread-case having near its heel and adjacent to the other end of said rib or flange a second rib or flange which rises gradually from the body of the thread-case to form between said ribs or flanges a groove to receive and house the point of the said beak of the hook-ring.

3. The combination with the thread-case 10 provided at its upper or loop-dividing portion with the separated flanges or walls 80 and 81, the latter having the threading-slot 83, of the tension lever-spring a part of which is received between said flanges or walls and another part of which bears against the inner face of the said wall 81, said spring having the notched lip 86 overlying the top of said wall 81, and a screw for regulating the tension of said spring.

In testimony whereof we affix our signatures in presence of two witnesses.

PHILIP DIEHL.
MARTIN HEMLEB.

Witnesses:
HENRY J. MILLER,
W. IRVING HOUGHTON.